United States Patent Office 2,802,879
Patented Aug. 13, 1957

2,802,879
PRODUCTION OF HALOACETALS

Howard R. Guest, Charleston, and Harry A. Stansbury, Jr., South Charleston, W. Va., assignors to Union Carbide and Carbon Corporation, a corporation of New York No Drawing. Application March 11, 1953,
Serial No. 341,836

5 Claims. (Cl. 260—615)

This invention relates to a novel class of 2-haloalkoxy-substituted saturated aliphatic aldehydes and similarly substituted halogen-containing aldehydes, and halogen-substituted acetal derivatives of such aldehydes. It further concerns the production of these compounds in good yields by the reaction of aliphatic alpha, beta-unsaturated aldehydes with certain 1,2-alkylene halohydrins.

Processes already are known for reacting unsaturated aldehydes with alkanols to produce alkoxy-substituted saturated aldehydes. Such a process has long been known, and is disclosed in United States Patent No. 1,902,070. Similarly it has been known that alpha, beta-unsaturated aldehydes can be reacted with an alkanol to produce saturated acetals.

The present invention is based in important part upon the discovery that, under suitable conditions hereinafter disclosed, 1,2-alkylene halohydrins of the general formula

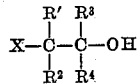

wherein R', $R^2$, $R^3$, and $R^4$, respectively, represent hydrogen or a lower alkyl group, and X designates chlorine or bromine, react with alpha, beta-unsaturated aliphatic aldehydes having the general formula

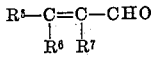

wherein $R^5$ designates a radical of the class consisting of hydrogen and the alkyl groups, and $R^6$ and $R^7$, respectively, designates a radical of the class consisting of hydrogen, chlorine, bromine and the lower alkyl groups, to provide good yields of a novel class of aldehydes containing therein one or more chlorine or bromine atoms and an ethereal oxy group, and having a structure represented by the formula:

wherein R', $R^2$, $R^3$, $R^4$, $R^5$, $R^6$, $R^7$ and X have the aforesaid meanings.

By reacting such a halohydrin and unsaturated aldehyde in a molar ratio of around three or more to one there are produced halogen-substituted acetals of haloalkoxyalkanols, having a structure represented by the formula:

wherein R', $R^2$, $R^3$, $R^4$, $R^5$, $R^6$, $R^7$ and X have the aforesaid meanings.

The novel products of the invention are useful intermediates for the synthesis of other compounds. They are good solvents for various lubricating oils and greases, such as must be cleaned from metals before painting or plating with another metal. They also have utility as cross-linking agents in the production of certain of synthetic rubber compositions of the polysulfide (Thiokol) type.

Ethylene chlorohydrin (2-chloroethanol) and propylene chlorohydrin (1-chloropropanol-2) are particularly useful in the process, and yield compounds having especial utility as cross-linking agents for the production of certain types of synthetic rubber. Other useful halohydrins include ethylene bromohydrin, 1-bromopropanol-2, 1-chlorobutanol-2, 2-chloropropanol-1 and 2-chloroisobutanol-1.

Although the preferred alpha, beta-unsaturated aliphatic aldehydes useful in the process include acrolein, crotonaldehyde and 2-methylacrolein, other aldehydes such as 2-chloroacrolein, 2-bromoacrolein, 2-ethyl-3-propylacrolein, 2-ethylacrolein, 2-chlorocrotonaldehyde, 2-bromocrotonaldehyde and 2-ethylcrotonaldehyde also can be employed.

In carrying out the process it is preferred to add the unsaturated aldehyde in small successive increments to the dry or anhydrous alkylene halohydrin, alone or mixed with a small amount of an acid catalyst for the reaction. The most efficient procedure results when an excess of the halohydrin is used, although the reactions proceed when the unsaturated aldehyde is in excess. The reaction temperature required to achieve the highest yields varies with the reactants employed. Thus ethylene chlorohydrin reacts readily with acrolein at 40° C., and temperatures as low as 10° C. are useful, while for rapid reaction with 2-ethyl-3-propylacrolein a temperature above 50° C. and a longer reaction period are required. At temperatures above about 170° C. the formation of by-products seriously lowers the efficiency of the reaction.

After completion of the reaction the catalyst is neutralized by addition of a dry alkaline compound such as sodium acetate, and the reaction mixture then is fractionally distilled under subatmospheric pressure for recovery of the desired compounds.

The reaction proceeds best in an acidic medium. Preferably an acid catalyst is used. Excellent catalysts include hydrochloric acid, sulfuric acid, phosphoric acid, hydrobromic acid, and the stronger organic acids such as the toluenesulfonic acids, the halogenated acetic acids, and oxalic acid. Formic and acetic acids are effective. Traces of hydrochloric acid in the chloroalkanols, such as specification grade anhydrous ethylene chlorohydrin, which contains up to 0.02% of hydrogen chloride, will cause the reaction to occur in the absence of added catalysts. An alkaline catalyst is not feasible because of the rapid reaction of halohydrins with basic materials.

The reaction can be conducted in the presence of an inert solvent for the reactants, such as carbon tetrachloride, benzene, toluene, dibutyl ether, hexane, etc., although excellent yields of the desired products are secured in the absence of inert solvents. After the reaction is stopped by neutralization with sodium acetate or the like to destroy the acid catalyst, the water formed by the acetal reaction may be removed in the fore-fractions during the subsequent distillation of the reaction mixture. In the examples some of the water distilled off as a heterogeneous azeotrope with unreacted aldehyde while the remainder of the water distilled as a homogeneous azeotrope with the excess ethylene halohydrin.

The water of reaction can be removed as formed by refluxing a mixture of the aldehyde, ethylene halohydrin, hydrogen halide catalyst and an inert solvent such as benzene at atmospheric pressure, allowing the condensate to stratify in a decanter, the water layer being removed and the benzene layer being returned to the column as reflux until no further water is separated in the decanter. The mixture then is neutralized with sodium acetate to destroy the catalyst and is then fractionally distilled to recover the desired products.

In another method a mixture of the aldehyde, ethylene halohydrin, sulfuric acid catalyst and anhydrous sodium sulfate is heated with agitation for several hours. The water forms hydrated sodium sulfate which is removed by filtration. The filtrate then is neutralized to destroy the acid catalyst and is fractionally distilled.

The following examples serve to restate the invention:

EXAMPLE 1

A mixture of 1610 grams (20 mols) of anhydrous ethylene chlorohydrin and 15 cc. of 37% hydrochloric acid was agitated at 40°–47° C. while 236 grams (4 mols) of 95% acrolein were added dropwise during 35 minutes. After another hour at 40° C., 17 grams of anhydrous sodium acetate were added to neutralize the catalyst, and the neutralized mixture was fractionally distilled under vacuum. After removal of unreacted starting materials and water, there were separately recovered a yield of 26% of 3-(2-chloroethoxy)propionaldehyde having the following properties:

|  | Equivalent Weight as Aldehyde | Weight, Percent | | Boiling point at 10 mm. of mercury, °C. | Sp. Gr., 20/20° C. | $n_D^{30°}$ |
| --- | --- | --- | --- | --- | --- | --- |
|  |  | C | H |  |  |  |
| Observed | 145 | 44.3 | 6.8 | 81 | 1.153 | 1.4444 |
| Theoretical | 136.5 | 44.0 | 6.6 |  |  |  |

A yield of 66% of 1,1,3-tri(2-chloroethoxy)propane also was recovered, having the following properties:

|  | Weight, Percent | | | Boiling point at 5 mm. of mercury, °C. | Sp. Gr., 20/20° C. | $n_D^{30°}$ |
| --- | --- | --- | --- | --- | --- | --- |
|  | C | H | Cl |  |  |  |
| Observed | 38.8 | 6.5 | 36.1 | 155 | 1.250 | 1.4714 |
| Theoretical | 38.6 | 6.1 | 38.1 |  |  |  |

EXAMPLE 2

A mixture of 1890 grams (20 mols) of anhydrous propylene chlorohydrin and 22.6 grams (0.62 mol) of dry hydrogen chloride was agitated at 54° C. while 280 grams (4 mols) of anhydrous crotonaldehyde were introduced during 30 minutes. The mixture was stirred at 60°–65° C. for a total of 8.5 hours and allowed to stand for a total of 32 hours at 25° C. Then 54 grams (0.66 mol) of anhydrous sodium acetate were added to neutralize the hydrogen chloride catalyst; and the resultant mixture was fractionally distilled under vacuum, separately recovering therefrom 3-(2-chloroisopropoxy)butyraldehyde and 1,1,-3-tri(2-chloroisopropoxy)butane, respectively having the following properties:

3-(2-chloroisopropoxy)butyraldehyde

|  | Weight, Percent | | | Boiling point at 3 mm. Hg, °C. | Sp. Gr., 20/20° C. | $n_D^{30°}$ |
| --- | --- | --- | --- | --- | --- | --- |
|  | C | H | Cl |  |  |  |
| Observed | 53.6 | 7.8 | 21.2 | 65 | 1.061 | 1.4719 |
| Theoretical | 50.1 | 7.9 | 21.6 |  |  |  |

1,1,3-tri(2-chloroisopropoxy)butane

|  | Weight, Percent | | | Boiling point at 2 mm. Hg, °C. | Sp. Gr., 20/20° C. | $n_D^{30°}$ |
| --- | --- | --- | --- | --- | --- | --- |
|  | C | H | Cl |  |  |  |
| Observed | 49.3 | 7.5 | 28.9 | 138 | 1.131 | 1.4650 |
| Theoretical | 46.5 | 7.5 | 31.7 |  |  |  |

EXAMPLE 3

A mixture of 418 grams (3.3 mols) of 2-bromoethanol and 3.3 grams of 49.1% hydrobromic acid (0.2 equivalent) in water was agitated at 40°–45° C. while 185 grams of acrolein (3.2 mols) were fed dropwise thereto during 25 minutes. After stirring for another hour at 40°–45° C., 2.5 grams of anhydrous sodium acetate (0.03 equivalent) were added and the reaction mixture was fractionally distilled under vacuum in an unpacked column still.

Good yields of 3-(2-bromoethoxy)propionaldehyde and 1,1,3-tri(2-bromoethoxy)propane were secured. The former boiled at 88°–91° C. under a pressure of 3 mm. of mercury. It had a sp. gr. 20°/20° C. of 1.5640; $n_D^{20°}$ of 1.4975; and a molecular refraction at 20° C. of 33.9 (theoretical=34.7).

The 1,1,3-tri(2-bromoethoxy)propane boiled within the range 140°–145° C. under 3 mm. of mercury pressure. It had a sp. gr. 20/20° C. of 1.6930; $n_D^{20°}$ of 1.5152; and a molecular refraction at 20° C. of 72.0 (theoretical=73.9).

EXAMPLE 4

A mixture of 7 grams of concentrated sulfuric acid (0.143 equivalent) and 1228 grams of ethylene chlorohydrin (9.6 mols) were agitated at 25°–40° C. while 174 grams (1.92 mols) of 2-chloroacrolein were added during 5 minutes. After standing 16 hours at 25° C. and heating at 60° C. for 5 hours, the catalyst was neutralized by the addition of 15 grams (0.18 mol) of anhydrous sodium acetate. The mixture then was fractionally distilled under vacuum in an unpacked column still. An 81 gram yield of 3-(2-chloroethoxy)2-chloropropionaldehyde was secured in the form of a colorless liquid boiling at 81°–83° C. under a pressure of 3 mm. of mercury, and having a sp. gr. 20/20° C. of 1.345; $n_D^{20}$=1.4874; and a molecular refraction at 20° C. of 36.5 (theoretical=36.7).

A yield of 224 grams of 2-chloro-1,1,3-tri-(2-chloroethoxy)propane also was secured, as a colorless liquid boiling at 162°–170° C. under a pressure of 5 mm. of mercury. It had the following properties:

|  | Analysis, Weight, Percent | | | Sp. Gr. 20/20° C. | $n_D^{20°}$ | Molecular Refraction |
| --- | --- | --- | --- | --- | --- | --- |
|  | C | H | Cl |  |  |  |
| Observed | 35.0 | 5.3 | 45.8 | 1.321 | 1.4864 | 68.3 |
| Theoretical | 34.4 | 5.1 | 45.2 |  |  | 68.2 |

EXAMPLE 5

(No added catalyst)

To 1610 grams of an agitated body of freshly distilled ethylene chlorohydrin of 98.5% purity, containing 0.015% by weight of hydrogen chloride (20 mols), held at 40° C. there were added dropwise during 30 minutes 231 grams (4 mols) of 97% acrolein. The agitation was continued at 40°–43° C. for 6.5 hours and then at 62° C. for 7.5 hours. At this point analysis showed that there was 0.040% of hydrogen chloride and 0.96% of acrolein in the solution. There were then added to the reaction mixture 1.7 grams (0.021 mol) of anhydrous sodium acetate, and the mixture was fractionally distilled under reduced pressure to obtain 3-(2-chloroethoxy)propionaldehyde (27% yield) and 1,1,3-tri-(2-chloroethoxy)propane (56% yield), with an efficiency of 90%, based upon the acrolein.

In the accompanying claims the terms, 1,2-halohydrins and 1,2-(alkylene) halohydrins are intended to designate those alkylene halohydrins wherein the halogen atom and the hydroxy group are attached to adjacent carbon atoms.

We claim:

1. As new products, haloacetals having structures designated by the formula

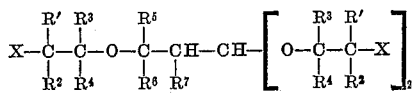

wherein R', R², R³, R⁴ and R⁵, respectively, are selected from the class consisting of hydrogen and the lower alkyl groups; R⁶ and R⁷, respectively, are selected from the class consisting of hydrogen, chlorine, bromine, and the lower alkyl groups; and X is selected from the class consisting of chlorine and bromine.

2. As a new compound, 1,1,3-tri(2-chloroethoxy)-propane.

3. As a new compound, 1,1,3-tri(2-chloroisopropoxy)-butane.

4. As a new compound, 1,1,3-tri(2-bromoethoxy)-propane.

5. As a new compound, 2-chloro-1,1,3-tri(2-chloroethoxy)propane.

References Cited in the file of this patent

UNITED STATES PATENTS

| | | |
|---|---|---|
| 2,276,666 | Ostrowski et al. | Mar. 17, 1942 |
| 2,288,211 | Schulz | June 30, 1942 |
| 2,374,494 | Morey | Apr. 24, 1945 |
| 2,473,014 | Croxall et al. | June 14, 1949 |
| 2,504,680 | Gresham | Apr. 18, 1950 |
| 2,561,254 | Whetstone et al. | July 17, 1951 |
| 2,622,101 | Paul et al. | Dec. 16, 1952 |

OTHER REFERENCES

Henry: "Berichte der deutschen chemischen Gesellschaft," 28 (1895), pp. 850–1.